United States Patent
Rozsa

(10) Patent No.: US 6,534,771 B1
(45) Date of Patent: Mar. 18, 2003

(54) GAMMA CAMERA PLATE ASSEMBLY FOR PET AND SPECT IMAGING

(75) Inventor: Csaba M. Rozsa, Brecksville, OH (US)

(73) Assignee: Saint Gobain Industrial Ceramics, Inc., Worcester, MA (US)

( * ) Notice: Subject to any disclaimer, the term of this patent is extended or adjusted under 35 U.S.C. 154(b) by 0 days.

(21) Appl. No.: 09/535,715

(22) Filed: Mar. 27, 2000

Related U.S. Application Data

(60) Provisional application No. 60/138,042, filed on Jun. 8, 1999.

(51) Int. Cl.$^7$ .................................................. G01T 1/20
(52) U.S. Cl. ...................................................... 250/367
(58) Field of Search ................................. 250/367, 368

(56) References Cited

U.S. PATENT DOCUMENTS

| | | | | |
|---|---|---|---|---|
| 3,102,955 A | * | 9/1963 | Carlson | 250/368 |
| 3,745,359 A | * | 7/1973 | Martone | 250/369 |
| 4,145,609 A | * | 3/1979 | Takami et al. | 250/368 |
| 4,647,781 A | * | 3/1987 | Takagi et al. | 250/483.1 |
| 4,870,667 A | * | 9/1989 | Burnett et al. | 378/19 |
| 5,393,981 A | * | 2/1995 | Szabo et al. | 250/367 |

FOREIGN PATENT DOCUMENTS

| | | | | |
|---|---|---|---|---|
| EP | 437051 A2 | * | 7/1991 | G01T/1/202 |

\* cited by examiner

*Primary Examiner*—Constantine Hannaher
*Assistant Examiner*—Shun Lee
(74) *Attorney, Agent, or Firm*—Volker R. Ulbrich; Renner, Otto, Boisselle & Sklar, LLP

(57) ABSTRACT

A gamma camera scintillation crystal plate assembly and method that may be used for both PET (positron emission tomography) and SPECT (single photon emission computer tomography). The crystal plate assembly includes two or more crystals which are optically coupled and tuned so as to control the energy position of the photopeaks at an output surface of the plate assembly. The crystals are tuned by various means including varying the surface finishes and material selection.

24 Claims, 7 Drawing Sheets

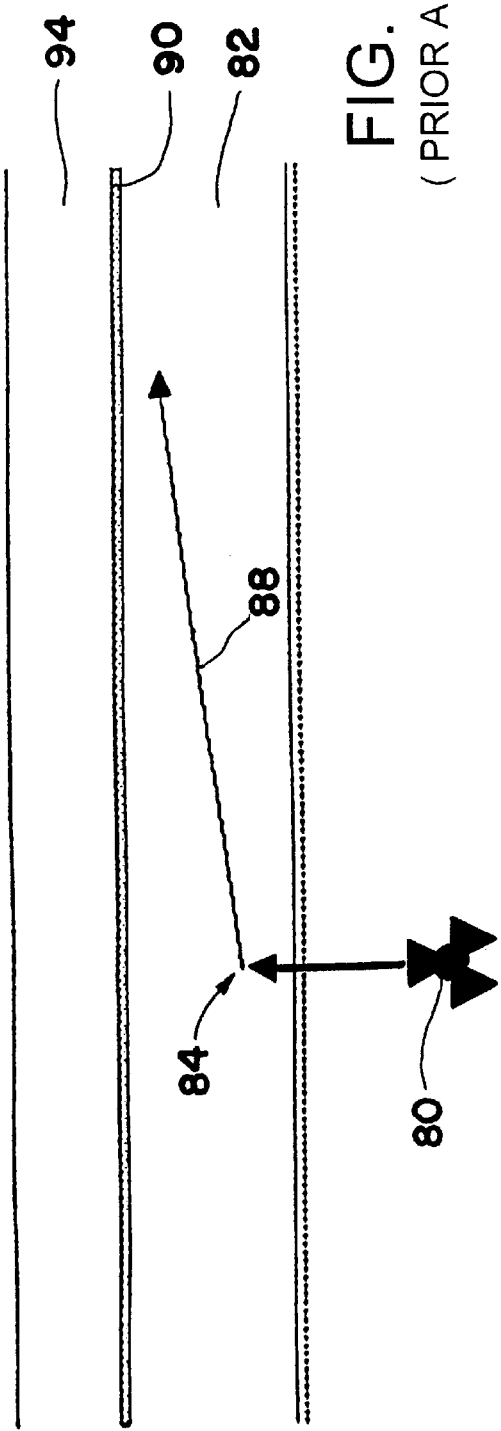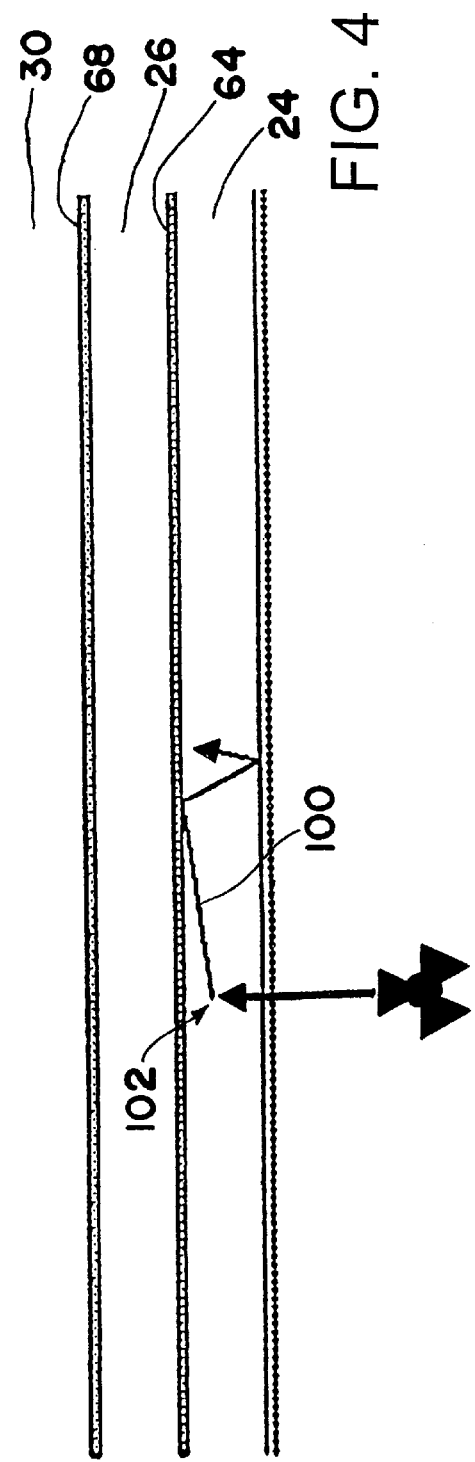

GAMMA CAMERA PLATE ASSEMBLY FOR PET AND SPECT IMAGING

CROSS-REFERENCE TO RELATED APPLICATIONS

This application claims the benefit of the abandoned provisional application No. 60/138,042 filed Jun. 8, 1999.

TECHNICAL FIELD OF THE INVENTION

The present invention relates to gamma camera scintillation plate assemblies and methods which may be used to detect both high-energy and low-energy radiation emissions for PET and SPECT imaging.

BACKGROUND OF THE INVENTION

Crystal scintillation detector plates are widely used in nuclear medicine to image tissues containing radioactive tracer compounds (radiopharmaceuticals). introduced into a patient. Gamma quanta such as photons from the radioactive tracer compounds are collimated into the detector plate. The photons interact with a scintillation crystal or crystals in the detector plate to produce photons of light-scintillations.

A matrix of photomultiplier tubes is optically coupled to the detector plate's window to detect the scintillations produced in the crystal. The camera's electronics analyze the relative pulse heights from the photomultiplier tubes to compute the locations of the scintillation events in the crystal and to evaluate the corresponding intake of the tracer by the tissue. This information is expressed in an image.

Several different nuclear medicine cameras have evolved for particular applications. One type of camera utilizes single-photon emission computed tomography (SPECT) imaging. These cameras are typically used with radiopharmaceuticals such as thallium and technetium that produce lower energy (approximately 140 keV) gamma rays. These cameras generally have detectors with large, thin scintillating crystals. SPECT cameras often use a collimator that acts as a lens to create the image slices that are assembled by the computer into an image. Such cameras generally produce good resolution at a reasonable cost for some types of studies.

Another type of camera utilizes positron emission tomography (PET) imaging. Typical PET systems use fluorine-18 deoxyglucose (FDG) as a radiopharmaceutical. As FDG decays it emits two 511 keV gamma rays resulting from electron-positron annihilation. PET imaging systems generally have thicker crystals to stop the high-energy radiation before it passes through the crystal.

In both the SPECT and the PET systems, choosing a crystal thickness involves a tradeoff between the desire to convert a significant amount of radiation to light (which makes a thicker crystal more desirable) and the desire to achieve high image resolution (which makes a thinner crystal more desirable).

Gamma camera manufacturers have created hybrid cameras with dual detector heads, one of which is designed to operate in a SPECT mode and the other of which is designed to operate in PET mode. However, such hybrid systems are significantly more costly than SPECT systems, and suffer from lower sensitivity as compared to PET scanners.

From the foregoing, it will be understood that a need exists for improved crystal scintillation detector plates which may be used for both PET imaging and SPECT imaging.

SUMMARY OF THE INVENTION

The present invention provides a gamma camera scintillation crystal plate assembly and method that may be used for both PET (positron emission tomography) and SPECT (single photon emission computer tomography). The crystal plate assembly includes two or more crystals which are optically coupled. The result is one or more internal interfaces at which scintillation light is reflected, refracted, or scattered to prevent the loss of resolution that otherwise would arise in a crystal plate formed by a single crystal of the same thickness. The two or more crystals may be made of the same material or may be made of different materials. The crystal materials, the surface treatments of the crystals (such as their roughness), and the characteristics of the scattering at the internal interface(s) may be selected so as to tune the output of the gamma camera, such as by combining together the photopeaks of the two or more crystals, or alternatively by separating the photopeaks of the crystals.

According to one aspect of the invention, a crystal plate assembly for a gamma camera comprises an entrance scintillation crystal having an entrance surface and a coupling surface, and a downstream scintillation crystal having an interface surface and an exit surface. The interface surface is optically coupled to the coupling surface, and at least one of the two surfaces of one of the crystals is rougher than said surfaces of the other crystal, whereby the relative light output of the crystals is controlled.

In one preferred embodiment, the amount of scintillation light passing through the exit surface of the downstream crystal due to and in the vicinity of a scintillation event in the entrance crystal is substantially the same as an amount of scintillation light passing through the exit surface due to and in the vicinity of a like scintillation event in the downstream crystal. In an alternative preferred embodiment, the amount of scintillation light passing through the exit surface due to and in the vicinity of a scintillation event in the entrance crystal is sufficiently different from an amount of scintillation light passing through the exit surface due to and in the vicinity of a like scintillation event in the downstream crystal, such that the energy peak of the former falls in an energy valley of the latter.

In a preferred embodiment, the entrance crystal includes at least one of said surfaces that is rougher than said surfaces of the other crystal.

In a preferred embodiment, at least one of said surfaces that is rougher than said surfaces of the other crystal is the entrance surface of said entrance crystal.

In a preferred embodiment, the downstream crystal includes said at least one of said surfaces that is rougher than said surfaces of the other crystal.

In a preferred embodiment, the crystals are made of the same material.

In another preferred embodiment, the crystals are made of different materials.

In a preferred embodiment, the material of the entrance crystal generates more scintillation light in response to incident high energy radiation than the material of the downstream crystal in response to like incident high energy radiation.

In a preferred embodiment, an optical coupling material optically couples the interface surface and the coupling surface.

In a preferred embodiment, the entrance crystal material is hygroscopic and the downstream crystal material is non-hygroscopic.

In a preferred embodiment, the entrance crystal material is NaI(Tl).

In a preferred embodiment, the downstream crystal material is BGO.

In a preferred embodiment, the entrance crystal and the downstream crystal have a combined thickness of at least 0.75 inches.

In another preferred embodiment, the entrance crystal and the downstream crystal have a combined thickness of at least one inch.

In a preferred embodiment, the coupling surface is rougher than the. interface surface.

In a preferred embodiment, the downstream crystal has a light absorbing material at at least one side surface thereof.

According to another aspect of the invention, a detector plate assembly for a gamma camera comprises a crystal plate assembly including an entrance scintillation crystal and a downstream scintillation crystal optically coupled to the entrance scintillation crystal. The crystal plate assembly has an exit surface for optical coupling to one or more light sensing devices, and the crystals have been tuned either (i) to match at the exit surface the energy of the photopeaks of light originating from the respective crystals or (ii) to locate the photopeak of one in the energy valley of the other.

In a preferred embodiment, the crystals have been tuned by imparting different surface finishes to surfaces of the crystals.

According to another aspect of the invention, a method of making a crystal plate assembly for a gamma camera comprises tuning two or more scintillation crystals to be optically coupled in a crystal plate assembly so as to control the energy position of the photopeaks at an output surface of the plate assembly; and optically coupling the crystals.

In a preferred embodiment, the tuning includes tuning the crystals such that photopeaks of at least two of the crystals are separated at the output surface of the plate assembly.

In another preferred embodiment, the tuning includes tuning the crystals such that photopeaks of at least two of the crystals are brought together at the output surface of the plate assembly.

In a preferred embodiment, the tuning includes selecting different materials for each of the two or more crystals. Preferably, one of the materials generates more scintillation light in response to incident radiation than another of the materials to like radiation.

In a preferred embodiment, the tuning includes treating surfaces of the crystals to vary the amount of internal reflection and scattering at the surfaces of the crystals.

In a preferred embodiment, the two or more crystals include an entrance crystal and a downstream crystal, the tuning includes providing a relatively less rough surface on the downstream crystal and a relatively rougher surface on the entrance crystal, and the optically coupling includes optically coupling the relatively less rough surface and the relatively rougher surface.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings:

FIG. 3 is a schematic illustration of light scattering in a gamma camera plate assembly having a single thick crystal;

FIG. 4 is a schematic illustration of light scattering in a gamma camera plate assembly according to the present invention;

DETAILED DESCRIPTION

Figure 1:
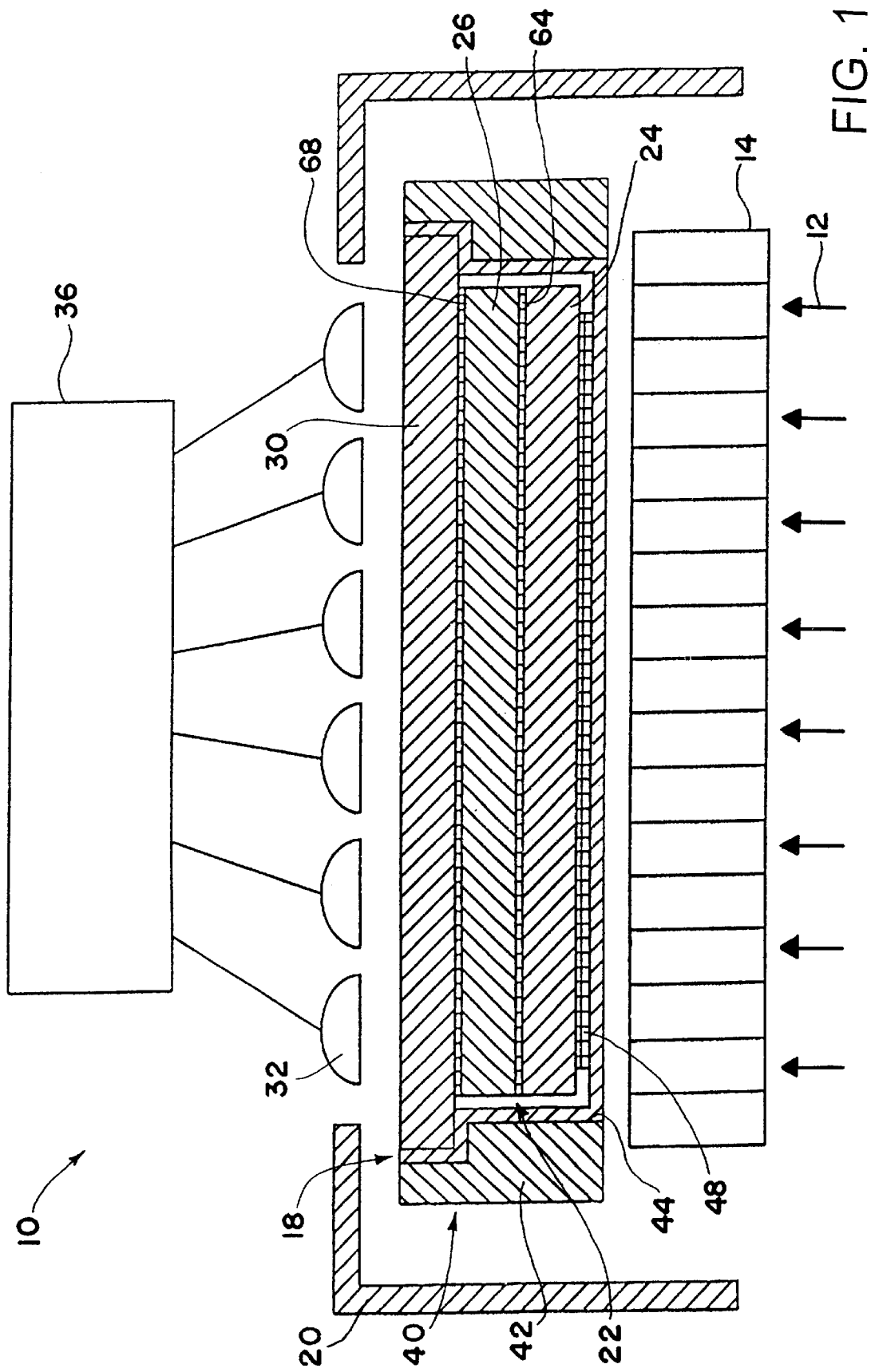
FIG. 1 is a schematic cross-sectional view of a gamma camera in accordance with the present invention.

Referring to FIG. 1, a gamma camera 10 is shown for detecting and measuring radiation emissions 12. The radiation emissions 12 may emanate, for example, from radioactive isotopes in a patient or other object to be imaged. The camera 10 preferably includes a collimator 14 through which the radiation emissions 12 must pass in order to reach a detector plate assembly 18. The collimator 14 aids in providing a sharp image by allowing passage only of radiation emissions that are aligned with holes in the collimator 14. A lead housing 20 prevents entry into the detector plate assembly 18 of radiation emissions other than those from the radiation source.

The emissions 12 which enter the detector plate assembly 18 interact with a multi-layer scintillator (crystal plate assembly) 22 which includes scintillation crystals, such as an entrance crystal 24 and a downstream crystal 26. It will be appreciated that "crystal," as used herein, includes modular or segmented crystals. The interaction between the emissions and the crystals produces photons of light (scintillations).

Light from the scintillation events passes through an optical window 30 which is part of the detector plate assembly 18. The optical window 30 is optically coupled to an array of light sensing devices such as photomultiplier tubes (PMTs) 32 which convert the scintillation light into electrical signals. The PMTs 32 are coupled to detection circuitry such as a computer and electronics 36, which amplify and otherwise process signals from the PMTs 32 and which output images or other information.

The detector plate assembly 18 includes a housing 40 for the scintillation crystals 24 and 26. If the scintillation crystals are hygroscopic, the housing should be hermetically sealed. The illustrated exemplary housing 40 includes a frame 42 which is typically made of a metal such as steel or aluminum, the optical window 30, and a back cap 44. The back cap 44 may be hermetically sealed to the window 30 by means of a glass-to-metal seal or other suitable sealing methods to provide a hermetic closure. A reflector 48 may be interposed between the back cap 44 and the entrance crystal 24 in a well known manner.

Figure 2:
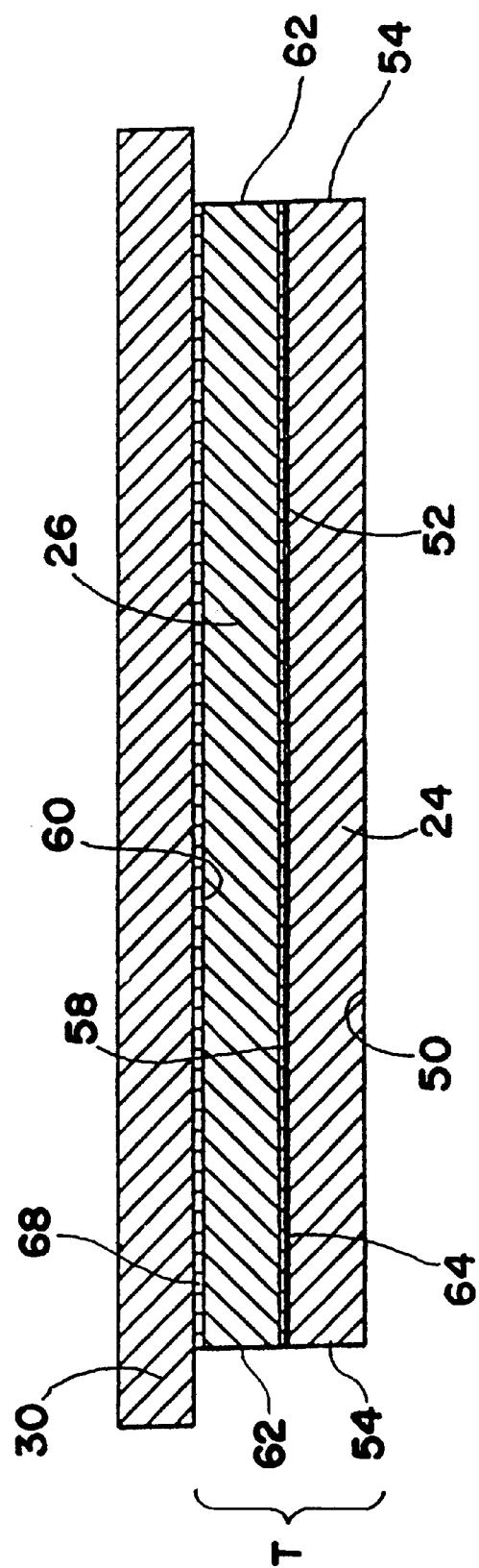
FIG. 2 is a fragmentary side view of a plate assembly used in the gamma camera detector shown in FIG. 1.

Referring to FIG. 2, details are shown of the connection between the crystals 24 and 26 and between the downstream crystal 26 and the window 30. The entrance crystal 24 preferably has the reflector 48 at its entrance surface 50 which is closest to the back cap 44. The reflector 48, for example, may be a spectrally reflecting metalized surface layer applied to the entrance surface or a layer of diffusely reflecting white material. The entrance crystal 24 also has a coupling surface 52 and side surfaces 54.

The downstream crystal 26 has an interface surface 58 which is closest to the entrance crystal 24, and an exit surface 60 which is opposite the interface surface 58 and is closest to the window 30. It also has side surfaces 62.

A crystal-crystal coupling 64 is provided between the coupling surface 52 of the entrance crystal 24 and the interface surface 58 of the downstream crystal 26. Similarly, a crystal-window coupling 68 is provided between the exit surface 60 of the downstream crystal 26, and the window 30.

The crystal-crystal coupling 64 and the crystal-window coupling 68 may include a silicone rubber coupler such as a room temperature vulcanizable silicone rubber for transmitting scintillation light. Such a silicone rubber coupler has an index of refraction of approximately 1.4, which is different from the index of refraction of the crystals, which may be approximately 1.8. It will be appreciated that other materials for optically and/or mechanically coupling devices may be suitable for use in the invention, and such other coupling materials or devices preferably should provide a comparable difference in the index of refraction at the crystal-coupling interface.

The overall thickness T of the entrance crystal 24 and the downstream crystal 26 is selected so that a sufficient fraction of the radiation emissions 12 which impinge on the crystals 24 and 26 interact with the crystals to produce scintillation events. Table 1 shows the percentages of 140 keV and 511 keV gamma rays which interact with various thicknesses of NaI(Tl) crystal. As can be seen from the table, the average thickness needed to absorb is much higher for the higher-energy 511 keV gamma rays than it is for the lower-energy 140 keV gamma rays. While almost all of the lower-energy gamma rays interact with a crystal that is 0.375" thick, at least double that thickness is required to obtain an appreciable interaction between the higher-energy gamma rays and the crystal.

TABLE 1

| Gamma Ray Energy (keV) | Average Depth (in.) | Thickness 0.375 in. | Thickness 0.75 in. | Thickness 1.0 in. |
| --- | --- | --- | --- | --- |
| 140 | 0.148 | 92% | 99% | 99% |
| 511 | 1.149 | 28% | 48% | 58% |

As mentioned above, use of a single thick crystal would result in a reduction of resolution for the system. The reason for this loss of resolution is illustrated in FIG. 3, which schematically illustrates a radiation emission 80 incident upon a thick crystal 82. The emission 80 interacts with the crystal 82 at location 84 producing a burst of scintillation light. A ray 88 of scintillation light travels away from the interaction location 84, taking position information about the scintillation event to a far PMT or even to the edge of the scintillation crystal 82 (where the position information is lost). The reason the ray of light 88 travels so far from the interaction position 84 is that there is nothing to change the direction of the light ray 88 unless and until the ray contacts a surface of the crystal, i.e., the crystal-window interface 90 between the crystal 82 and an optical window 94 in the case of the illustrated ray of light 88.

Referring to FIG. 4, if the thicker crystal is split into two thinner crystals such as the crystals 24 and 26, a ray of scintillation light 100 emanating from an interaction at position 102 in crystal 24 encounters the coupling surface 52 at the crystal-crystal coupling 64 where it may be scattered, thus enabling the light to pass through the coupling 64 at a location relatively close to the interaction position 102.

The material for the scintillation crystals may be selected from a wide variety of materials including NaI(Tl), NaI, BaF$_2$, BGO (Bi$_4$Ge$_3$O$_{12}$); CaF$_2$, CdWO$_4$, CsF, CsI(Tl), CsI(Na), CsI, YAP, LiI, LSO, and GSO. The two crystals may be made of the same or different materials.

The entrance crystal and the downstream crystal may have the same or different thicknesses. For example, the downstream crystal may be thicker than the entrance crystal. Such a configuration with the downstream crystal thicker than the entrance crystal helps preserve the resolution for interactions in the entrance crystal by providing the scattering intermediate boundary of the crystal-crystal coupling close to any such interactions. The thicker downstream crystal for such a configuration allows retention of the ability to capture a significant percentage of incident high-energy radiation emissions. Thus it will be appreciated that the downstream crystal may interact with more, fewer, or approximately the same number of radiation emissions as the entrance crystal, depending on the materials for the crystals and the relative thicknesses of the crystals.

In the illustrated preferred embodiment, the two crystals 24 and 26 are each about 0.375 inch thick for a combined thickness of about 0.75 inch. Generally, for NaI scintillators the entrance crystal will be in the range of about 0.25 inch to about 0.5 inch, and the downstream crystal generally will be in the range of about 0.375 inch to about 1.0 inch thick.

Figure 5:
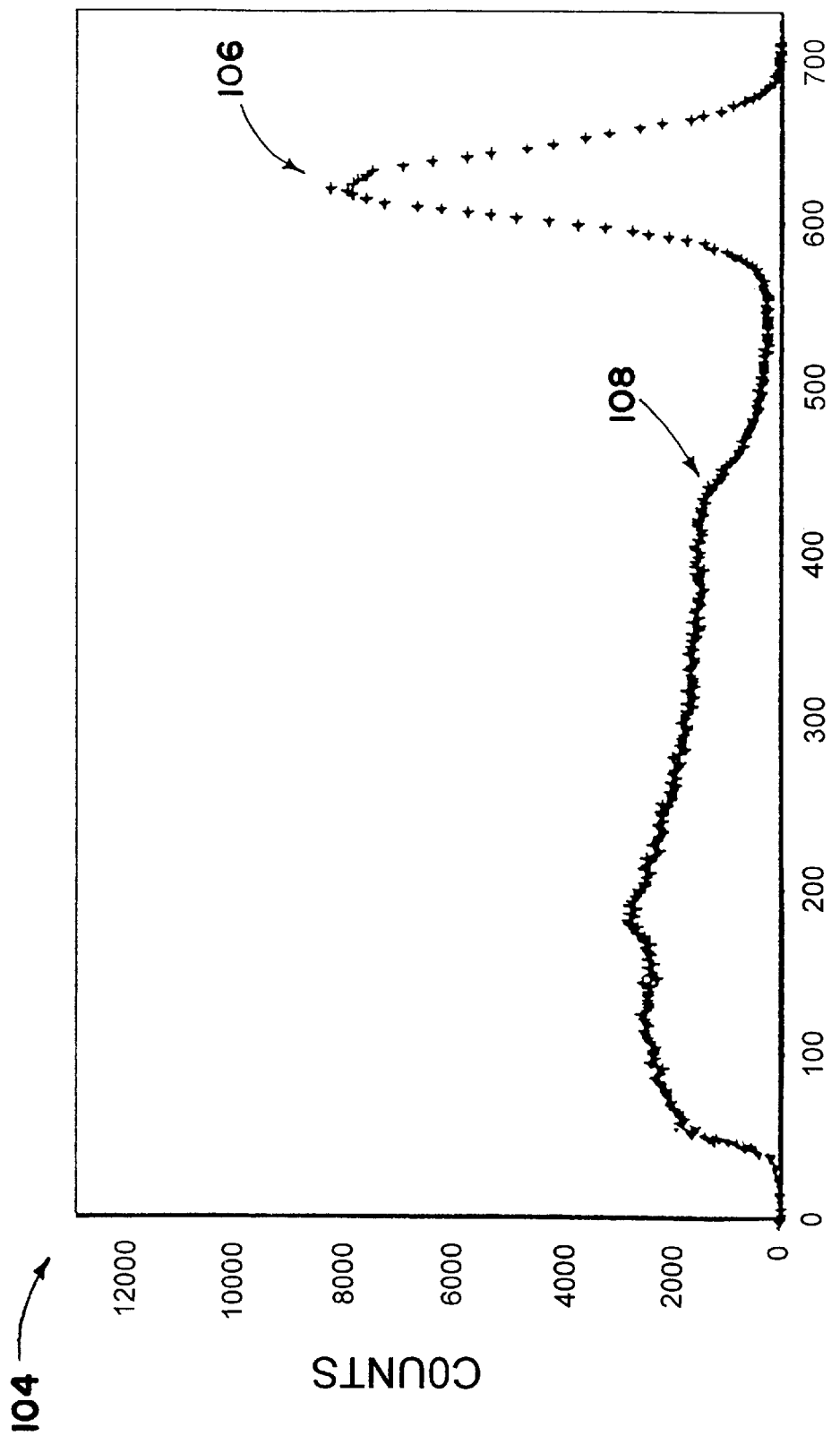
FIG. 5 is a graph illustrating a typical histogram output of a gamma camera.

The signals from the PMTs 32 generally are linearly amplified and then fed into a multichannel analyzer or equivalent device. The multichannel analyzer measures the voltage amplitude of the input pulse and stores a count in an appropriate memory location. When many pulses have been collected and binned (assigned to a channel), the result is a histogram of counts vs. voltage or counts vs. channel. A typical histogram 104 is shown in FIG. 5, wherein the vertical axis is the number of counts received over a certain sampling time, and the horizontal axis is the total voltage output of all of the PMTs for a given scintillation event. The voltage output is often evenly divided up into a plurality of channels, with a given voltage output corresponding to one of the channels.

Typically, all of the electronics are designed to be linear such that each channel (bin) is proportional to the energy of the photon that was detected and is inversely proportional to the wavelength. Thus, an increasing channel number is indicative of increasing energy.

For a given system and tracer, there will be a local peak in the number of counts at one or more (adjacent) channel numbers. Such a peak is shown at reference numeral 106 in FIG. 5, and is referred to as a photopeak. The photopeak is used to screen data received by the PMTs 32, in particular for scatter rejection. Only those events having a total energy (voltage) corresponding to the photopeak are used in constructing the image produced by the system. Events that have a total energy appreciably greater or less than that of the photopeak are not used in imaging. Such screened-out or rejected events may be due to radiation from other sources, for example, or from scattering such as Compton scattering, which occurs at channel numbers up to the Compton edge, shown at reference numeral 108.

The two or more scintillation crystals, such as the crystals 24 and 26, are tuned to achieve desired performance from the gamma camera 10. This desired performance may include achieving in whole or in part one or more of the following goals: 1) obtaining sufficiently high interaction probability between the incident radiation emissions (particularly high-energy emissions such as 511 keV gamma rays emitted from electron-positron annihilation) and the scintillation crystal; 2) avoiding the unacceptable loss of resolution (in position and/or energy) which may result from use of one or more thick crystal(s); 3) tuning the gamma camera so that the photopeaks of the crystals 24 and 26 substantially coincide (the photopeaks at substantially the same channel number); and 4) tuning the gamma camera so that the photopeaks of the crystals 24 and 26 are separate (the photopeaks not at substantially the same channel number and sufficiently far apart for discrimination purposes), thereby providing more comprehensive information regarding for. example the relative performance of the two crystals 24 and 26.

The methods or means of tuning the crystals 24 and 26 so as to achieve desired performance include one or more of the following: selection of crystal materials; various treatments of the surfaces of the crystals, including varying surface roughness and the grinding and/or polishing materials used; and varying other characteristics of the interface between the crystals. These tuned crystals and methods for tuning them are explained below in greater detail.

Figure 6:
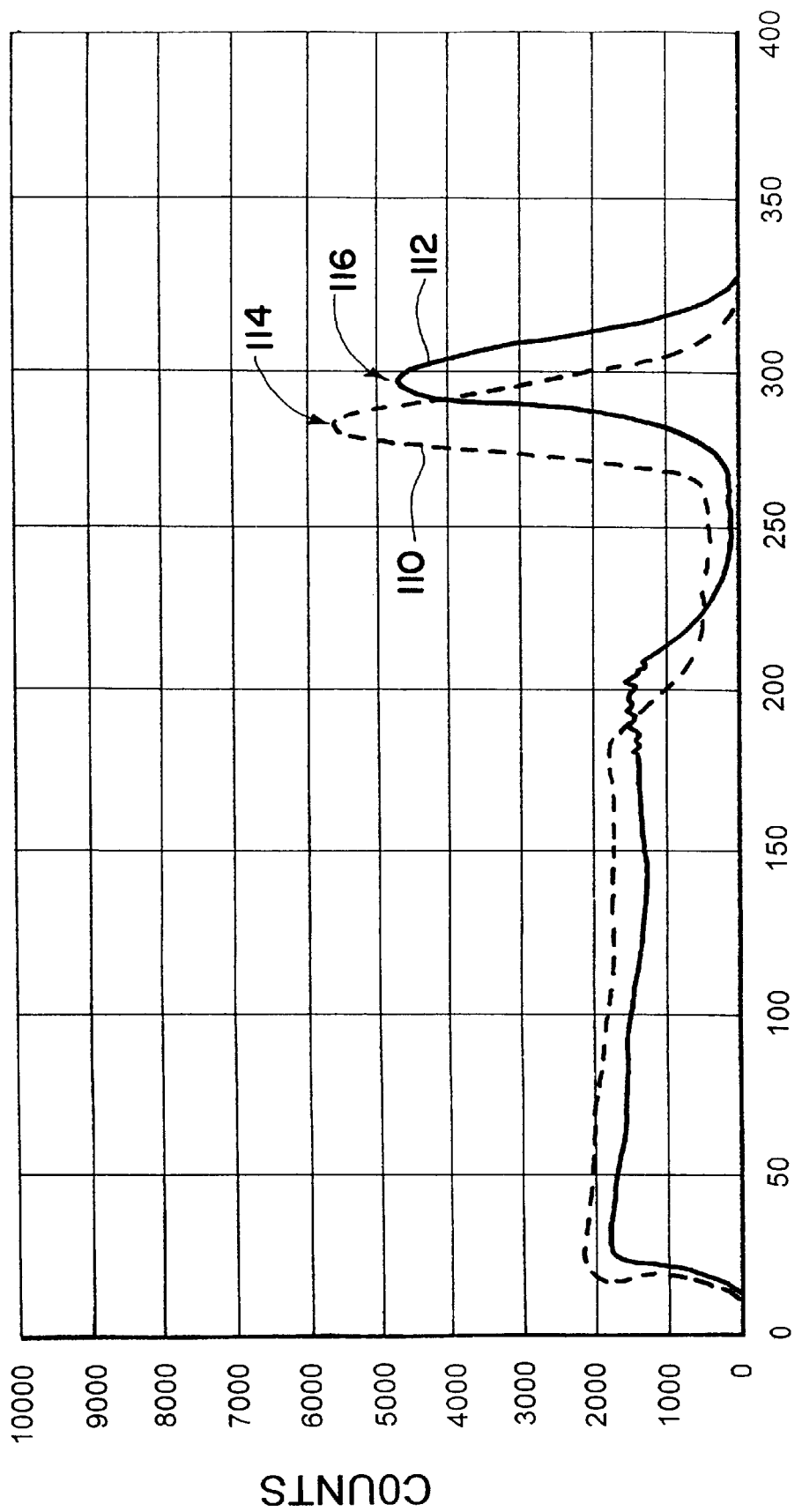
FIG. 6 is a graph illustrating an unshifted output of a gamma camera employing a two crystal plate assembly.

Referring to FIG. 6, typical histogram outputs from the individual crystals 24 and 26 are shown. The vertical axis is the number of counts received over a certain sampling time, and the horizontal axis is the channel number. The dashed line 110 corresponds to the output from the entrance crystal 24, while the solid line 112 corresponds to the output from the downstream crystal 26.

A peak 114 of the output 110 has a lower channel number than a peak 116 of the output 112. The lower channel number of the peak 114 corresponds to a lower voltage received from scintillation events in the entrance crystal 24. This lower voltage occurs because of increased losses from scintillation events in the entrance crystal 24, as compared to the losses for similar events in the downstream crystal 26. Such losses may be due, for example, to increased number of reflections of scintillation light before the light reaches the PMTs, since each reflection results in some loss of light. In addition, some light from scintillation events in the entrance crystal 24 may be lost (diverted or absorbed so as to not reach the PMTs 32) as it passes through the crystal-crystal coupling 64. Scintillation light from the downstream crystal 26 suffers less loss from the crystal-crystal coupling 64.

Although the outputs 110 and 112 are shown in FIG. 6 for clarity as separate plots on the same graph, it will be appreciated that the system will combine the two outputs together for a histogram showing the combined outputs of the two scintillation crystals 24 and 26. Thus an actual histogram of the output shown in FIG. 6 would be a sum of the two output curves 110 and 112. It will be appreciated that such a combined histogram will have a wider and less well-defined photopeak when compared to the output from a single one of the crystals. This wider photopeak may necessitate a change in the screening process used in selecting which scintillation events are used in imaging. More channels may be required to be used in imaging in order to capture the desired fraction of the scintillation events. By increasing the number of channels included for imaging, more undesired scattering events are included.

According to the invention, the gamma camera may be tuned so that the output (the photopeak) of light from one of the crystals is shifted relative to that of the other crystal. For example, it may be desirable to shift the two peaks to the same channel number to make the combined output from the crystals more closely resemble that of a single thick crystal. Methods for accomplishing this tuning are described below.

Figure 7:
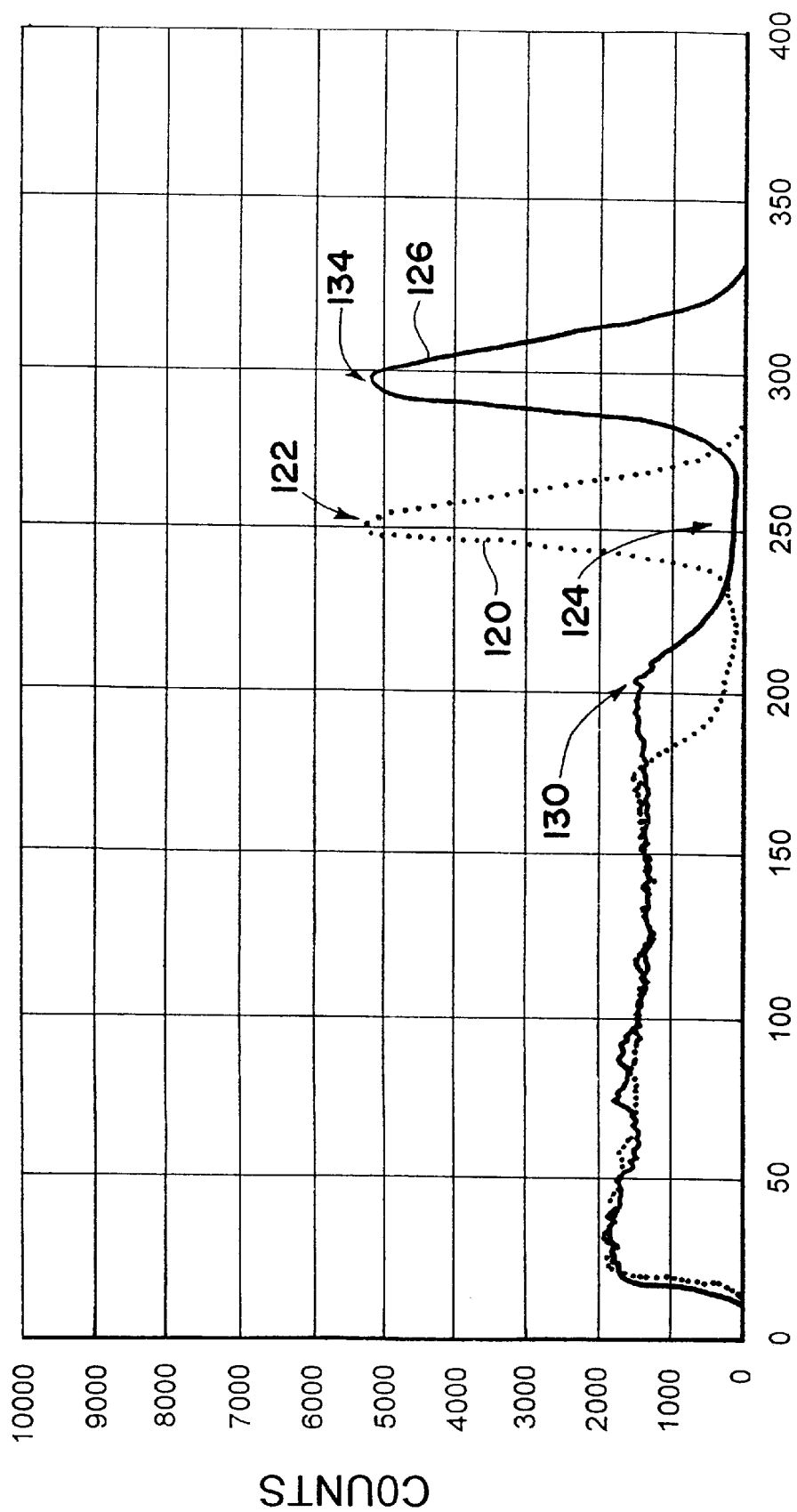
FIG. 7 is a graph illustrating a shifted output of a gamma camera employing a two crystal plate assembly in accordance with the present invention.

Alternatively, as shown in FIG. 7, it may be desirable to tune the gamma camera so as to separate the peaks such that they were at sufficiently different energies so that energy discrimination would be sufficient to tell in which crystal a given scintillation event occurred. Such information is useful in quantifying performance of the individual crystals. For example, a shifted output 120, shown as a dashed line, has its photopeak 122 shifted into a valley 124 of an unshifted output 126. The valley 124 is in the region between the Compton edge 130 of the output 126, and the photopeak 134 of the output 126. The Compton edge corresponds to the maximum energy photons produced by Compton scattering. By shifting the peak 122 into the valley 124, the combined output (the sum of the outputs 120 and 126) clearly shows the two peaks 122 and 134.

The above discussion relates primarily to high-energy radioactive emissions which cause appreciable scintillations in each crystal. However, it may be applicable as well to low-energy emissions.

One method of tuning the output of the gamma camera by shifting the channel numbers of the photopeaks is to change the crystal material of one of the crystals. The entrance crystal may be made of a slightly "hotter" material which produces somewhat more output light for a given scintillation event. This additional output per scintillation event may approximately offset the additional losses due to reflections and/or passing through the crystal-crystal interface that light from the entrance crystal encounters. Alternatively, the "hotter" material and "cold" material may be selected to put the photopeak from the "colder" crystal in the valley of the output from the "hotter" crystal.

Alternatively or additionally, the surfaces of the entrance crystal 24 and the downstream crystal 26 may be individually varied in roughness to control the locations of the photopeaks. By selecting the roughness of one or more of the crystal surfaces, the amount of scintillation light which reaches PMTs close to the scintillation event can be varied.

For example and with reference to FIG. 2, the entrance surface 50 of the entrance crystal 24 may be rougher than the surface 58 of the downstream crystal 26. Thus scintillation light produced in the entrance crystal 24 which impinges on the entrance surface 50 will be more likely to reach the PMTs 32 than scintillation light produced in the downstream crystal 26 which impinges on the surface 58. This is because the light impinging on the relatively rougher entrance surface 50 is more likely to become diffused, thus increasing the probability that a significant portion of such light will reach the PMTs closest to the scintillation event, and thereby be counted as part of the light from the scintillation event. In contrast, light impinging on the relatively smoother (less rough) surface 58 is more likely to be internally reflected, thereby decreasing the percentage of such light that will reach the PMTs closest to the scintillation event. The foregoing arrangement of relative surface roughnesses will therefore tend to move the photopeaks of the two crystals 24 and 26 together.

It will be appreciated that by varying the roughness of the exit surface 60, the proportion of light that is passed to the PMTs from events in the downstream crystal may be varied relative to the light passing from the entrance crystal through the downstream crystal. For example, a less rough surface 60 will increase the amount of light originating in the downstream crystal that is internally reflected and thus not passed to the PMTs. It is noted that the light passing from the entrance crystal through the downstream crystal will be less affected by the surface roughness of the exit surface than light originating in the downstream crystal because such first mentioned light will be more aligned with the normal to the surface 60.

It is well known that the roughness of a crystal surface may be controlled by the grit material used in grinding it. It is preferable to use a white grit such as aluminum oxide or magnesium oxide so as to avoid excessive loss of light at the ground surfaces. Preferably, the more rough surface(s) may be ground with a material having between 80 and 200 grit. More preferably, the more rough surface(s) may be ground with a material having between 80 and 180 grit. Even more preferably, the more rough surface(s) may be ground with a material having between 80 and 140 grit. Consequently, the smoother surfaces may be ground with grinding materials having a higher number grit, for example greater than 200 grit. As an alternative to grinding, the less rough surface(s) may be a polished (typically using a 300 to 400 grit material) or steel-wooled surface(s). It will be appreciated that separation of the photopeaks of the crystals 24 and 26 may be accomplished by having surfaces on the downstream crystal 26 that are more rough than surfaces on the entrance crystal 24. This would result in more light being internally reflected in the entrance crystal 24, thus lowering the channel number of the photopeak associated with the entrance crystal.

Figure 8:
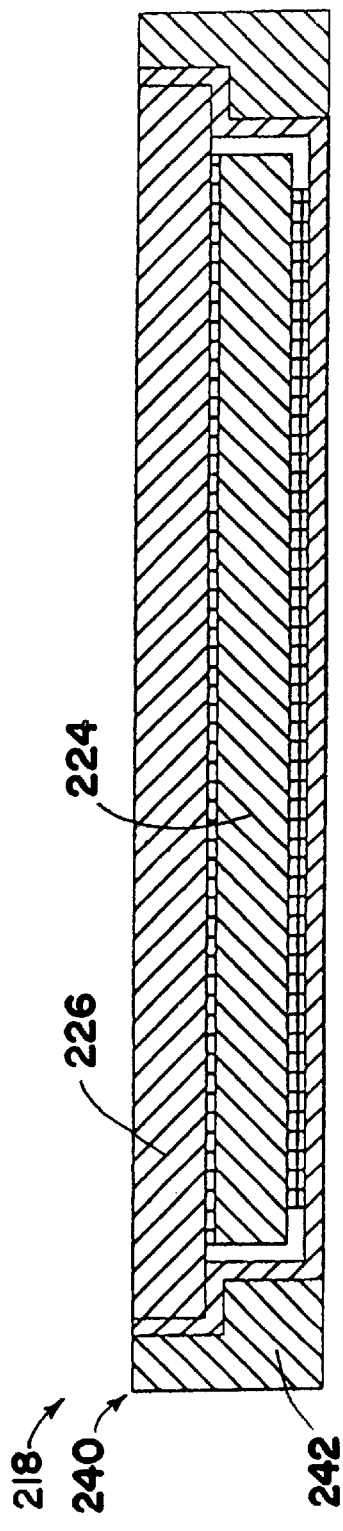
FIG. 8 is a schematic cross-sectional view of another gamma camera plate assembly in accordance with the present invention.

Turning now to FIG. 8, an alternate embodiment detector 218 is shown which has a hygroscopic entrance crystal 224 coupled to a non-hygroscopic downstream crystal 226. The downstream crystal may be hermetically-sealed at its outer peripheral portion to the frame 242 to provide a hermetically sealed enclosure 240 for the entrance crystal. Thus, the need for a separate optical window is eliminated.

The roughness of the interface surface 58 of the downstream crystal 26 and of the coupling surface 52 of the entrance crystal 24 may also be adjusted to enhance relative differences in the light cones (the amount of spread of the light from a scintillation event) emerging from each crystal layer. For example, if the coupling surface 52 was smoother than the interface surface 58, light exiting the entrance crystal 24 would be more specular (having a more widely spread light cone) than light from the downstream crystal 26 which diffusively reflects off of the interface surface 58. A difference in the spread of light may aid in identifying which layer is scintillating to allow for software separation and/or corrections.

The tuning may alternatively or in addition involve different treatments of the side surfaces 62 of the downstream crystal 26 and/or the side surfaces 54 of the entrance crystal 24. For example, one or more of the side surfaces may be rougher than other of the side surfaces, thus diffusing rather than reflecting light. As another example, one or more of the side surfaces may be ground with a light-absorbing grit, such as a gray silicon grit, or otherwise provided with a light absorbing material. A side surface ground with such a light-absorbing grit will absorb more light than a surface ground with a white grit. Thus, for example, the side surfaces 62 of the downstream crystal 26 could be ground with a grit that makes the resulting side surfaces absorb light, thereby reducing the energy of scintillation light reaching the PMTs 32 from the downstream crystal. Alternatively, the surfaces may be provided with reflective coating or layers to enhance reflection of light back into a crystal.

Turning now to FIG. 8, an alternate embodiment detector 218 is shown which has a hygroscopic entrance crystal 224 coupled to a non-hygroscopic downstream crystal 226. The downstream crystal may be hermetically-sealed at its outer peripheral portion to the frame 242 to provide a hermetically sealed enclosure for the entrance crystal. Thus, the need for a separate optical window is eliminated.

The entrance crystal may be made of thallium-doped sodium iodide (NaI(Tl)). The downstream crystal may be made of bismuth germinate, calcium fluoride, YAP, or LSO. It will be appreciated that other crystal materials suitable for use in the present invention may be used in addition to or in place of sodium iodide and bismuth germinate.

Figure 9:
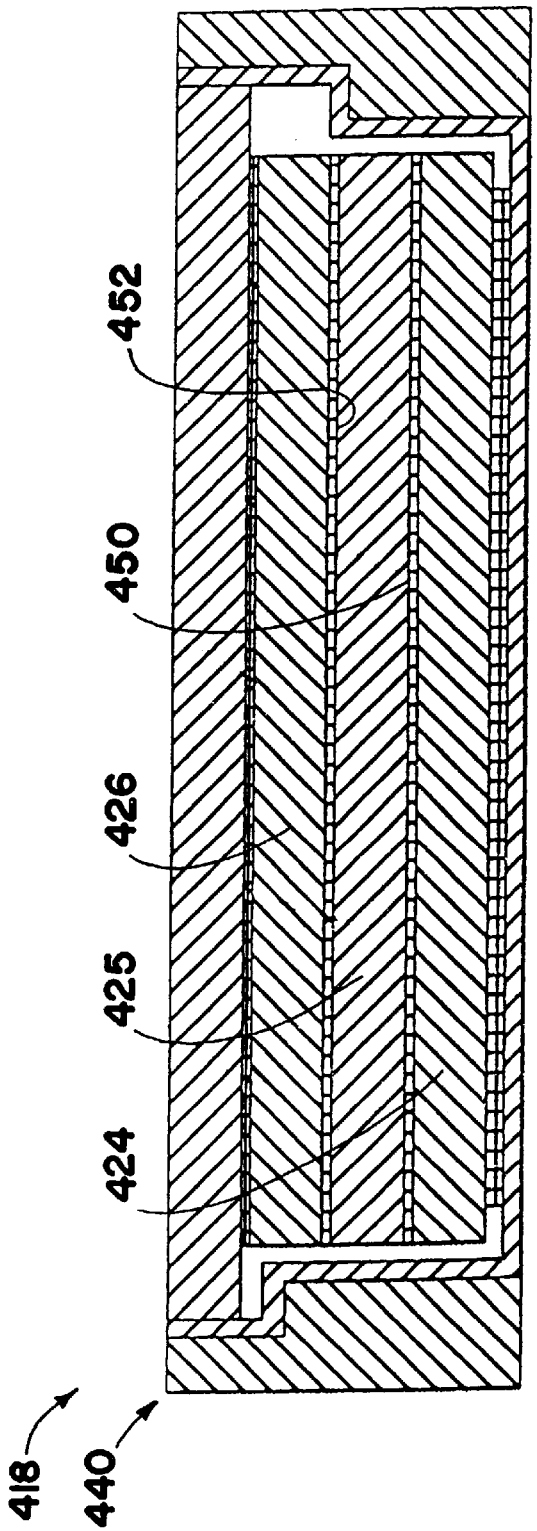
FIG. 9 is a schematic cross-sectional view of still another gamma camera detector assembly in accordance with the present invention.

Referring to FIG. 9, an additional alternate embodiment detector 418 is shown which has an entrance scintillation crystal 424, a middle scintillation crystal 425 and a downstream scintillation crystal 426. The crystals 424–426 are enclosed in a hermetically-sealed housing 440. The entrance crystal 424 and the middle crystal 425 may be tuned to absorb low-energy incident radiation, such as 80 keV and 120 keV radiation. The downstream crystal 426 absorbs appreciable radiation only when the incident radiation is high-energy radiation, such as 511 keV gamma rays produced from electron-positron annihilations.

The crystals 424–426 and crystal couplings 450 and 452 may be tuned as described above for consolidating or separating photopeaks from the crystals 424–426. It will be appreciated that use of three or more crystals increases the number of scattering surfaces between pairs of adjacent crystals, and consequently reduces the positional transport of scintillation light away from the location of a scintillation event, that was described above in connection with thick crystals.

The invention has been described above for use as part of a system for nuclear medicine imaging. It will be appreciated that the present invention may also be used in other applications involving the use of scintillation crystals to detect radiation emissions.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A crystal plate assembly for a gamma camera comprising:

an entrance scintillation crystal having an entrance surface and an opposite coupling surface; and a downstream scintillation crystal having an interface surface and an opposite exit surface, the interface surface optically coupled to the coupling surface;

wherein at least one of said surfaces of one of the crystals is rougher than said surfaces of the other crystal, whereby the relative light output of the crystals is controlled.

2. The crystal plate assembly of claim 1, wherein the crystals are tuned such that an amount of scintillation light passing through the exit surface due to and in the vicinity of a scintillation event in the entrance crystal is substantially the same as an amount of scintillation light passing through the exit surface due to and in the vicinity of a like scintillation event in the downstream crystal.

3. The crystal plate assembly of claim 1, wherein the crystals are tuned such that an amount of scintillation light passing through the exit surface due to and in the vicinity of a scintillation event in the entrance crystal is sufficiently different than an amount of scintillation light passing through the exit surface due to and in the vicinity of a like scintillation event in the downstream crystal, such that the energy peak of the former falls in an energy valley of the latter.

4. The crystal plate assembly of claim 1, wherein the entrance crystal includes said at least one of said surfaces that is rougher than said surfaces of the other crystal.

5. The crystal plate assembly of claim 1, wherein said at least one of said surfaces that is rougher than said surfaces of the other crystal is the entrance surface of said entrance crystal.

6. The crystal plate assembly of claim 1, wherein the downstream crystal includes said at least one of said surfaces that is rougher than said surfaces of the other crystal.

7. The crystal plate assembly of claim 1, wherein the crystals are made of the same material.

8. The crystal plate assembly of claim 1, wherein the crystals are made of different materials.

9. The crystal plate assembly of claim 8, wherein the material of the entrance crystal generates more scintillation light in response to incident high energy radiation than the material of the downstream crystal in response to like incident high energy radiation.

10. The crystal plate assembly of claim 1, comprising an optical coupling material which optically couples the interface surface and the coupling surface.

11. The crystal plate assembly of claim 1, wherein the entrance crystal material is hygroscopic and the downstream crystal material is non-hygroscopic.

12. The crystal plate assembly of claim 1, wherein the entrance crystal material is NaI(Tl).

13. The crystal plate assembly of claim 1, wherein the downstream crystal material is BGO.

14. The crystal plate assembly of claim 1, wherein the entrance crystal and the downstream crystal have a combined thickness of at least 0.75 inches.

15. The crystal plate assembly of claim 1, wherein the entrance crystal and the downstream crystal have a combined thickness of at least one inch.

16. The crystal plate assembly of claim 1, wherein the coupling surface is rougher than the interface surface.

17. The crystal plate assembly of claim 1, wherein the downstream crystal has a light absorbing material at at least one side surface thereof.

18. A detector plate assembly for a gamma camera comprising a crystal plate assembly including an entrance scintillation crystal and a downstream scintillation crystal optically coupled to the entrance scintillation crystal at optically coupled surfaces, wherein the crystal plate assembly has an exit surface for optical coupling to one or more light sensing devices, and the crystals have been tuned either (i) to match at the exit surface the energy of the photopeaks of light originating from the respective crystals or (ii) to locate the photopeak of one in the energy valley of the other, and wherein the crystals have been tuned by imparting different surface finishes to different ones of said optically coupled surfaces of the crystals.

19. A method of making a crystal plate assembly for a gamma camera, comprising:

tuning two or more scintillation crystals to be optically coupled in a crystal plate assembly so as to control the energy position of the photopeaks at an output surface of the plate assembly; and optically coupling the crystals respectively as upstream and downstream crystals in relation to the output surface of the plate assembly; and wherein the tuning includes treating the optically coupled surfaces of the crystals to vary the amount of internal reflection and scattering at the surfaces of the crystals.

20. The method of claim 19, wherein the tuning includes tuning the crystals such that photopeaks of at least two of the crystals are separated at the output surface of the plate assembly.

21. The method of claim 19, wherein the tuning includes tuning the crystals such that photopeaks of at least two of the crystals are brought together at the output surface of the plate assembly.

22. The method of claim 19, wherein the tuning includes selecting different materials for each of the two or more crystals.

23. The method of claim 22, wherein one of the materials generates more scintillation light in response to an incident ray than another of the materials to an incident gamma ray of the same energy.

24. The method of claim 19, wherein the two or more crystals include an entrance crystal and a downstream crystal, the tuning includes providing a relatively less rough surface on the downstream crystal and a relatively rougher surface on the entrance crystal, and the optically coupling includes optically coupling the relatively less rough surface and the relatively rougher surface.

* * * * *